United States Patent
Seon (10) Patent No.: US 8,384,692 B2
(45) Date of Patent: Feb. 26, 2013

(54) MENU SELECTION METHOD AND APPARATUS USING POINTING DEVICE

(75) Inventor: Young Kyu Seon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1706 days.

(21) Appl. No.: 11/789,963

(22) Filed: Apr. 26, 2007

(65) Prior Publication Data

US 2007/0262957 A1    Nov. 15, 2007

(30) Foreign Application Priority Data

Apr. 27, 2006   (KR) .................. 10-2006-0037966

(51) Int. Cl.
*G06F 3/042* (2006.01)
*G06F 3/048* (2006.01)

(52) U.S. Cl. ........ 345/175; 345/156; 345/173; 715/700; 715/764; 715/810; 715/817

(58) Field of Classification Search .......... 345/156, 345/157, 158, 161, 168, 169, 173, 175, 179; 178/18.01, 18.03, 18.09; 715/700, 764, 810, 715/817

See application file for complete search history.

(56) References Cited

U.S. PATENT DOCUMENTS

| | | | | |
|---|---|---|---|---|
| 5,543,588 A * | 8/1996 | Bisset et al. | ............... | 178/18.06 |
| 5,748,185 A * | 5/1998 | Stephan et al. | ............... | 345/173 |
| 5,914,783 A * | 6/1999 | Barrus | ............... | 356/614 |
| 6,292,179 B1 * | 9/2001 | Lee | ............... | 345/173 |
| 6,478,432 B1 * | 11/2002 | Dyner | ............... | 359/858 |
| 6,707,027 B2 * | 3/2004 | Liess et al. | ............... | 250/221 |
| 7,088,342 B2 * | 8/2006 | Rekimoto et al. | ............... | 345/169 |
| 7,180,510 B2 * | 2/2007 | Inoue et al. | ............... | 345/180 |
| 7,382,352 B2 * | 6/2008 | Chadha | ............... | 345/169 |
| 7,499,027 B2 * | 3/2009 | Brigham et al. | ............... | 345/158 |
| 2003/0234768 A1 * | 12/2003 | Rekimoto et al. | ............... | 345/169 |
| 2005/0275623 A1 * | 12/2005 | Chadha | ............... | 345/156 |

FOREIGN PATENT DOCUMENTS

| | | |
|---|---|---|
| KR | 1020020063338 | 8/2002 |
| KR | 1020020073432 | 9/2002 |
| KR | 1020050032948 | 4/2005 |
| KR | 1020050077507 | 8/2005 |

* cited by examiner

*Primary Examiner* — My-Chau T Tran (74) *Attorney, Agent, or Firm* — The Farrell Law Firm, P.C.

(57) ABSTRACT

A menu selection apparatus and method using a pointing means are disclosed. The menu selection apparatus includes a display unit for displaying a menu; a position change detector for detecting a change in a pointing-position of the pointing means; a control unit for outputting a menu selection control signal on the basis of a pointing-position change detected by the position change detector; and a pointer movement processor for updating, according to a menu selection control signal from the control unit, a virtual location of a pointer in units of menu items in a current menu screen. As a result, the precision of the pointer's movement for the purpose of menu navigation can be enhanced for user convenience.

21 Claims, 9 Drawing Sheets

MENU SELECTION METHOD AND APPARATUS USING POINTING DEVICE

PRIORITY

This application claims priority to a Korean Patent Application entitled "MENU SELECTION METHOD AND APPARATUS USING POINTING DEVICE" filed in the Korean Intellectual Property Office on Apr. 27, 2006 and assigned Serial No. 2006-0037966, the contents of which are incorporated herein by reference.

BACKGROUND OF THE INVENTION

1. Field of the Invention

The present invention relates generally to a mobile terminal having a pointing device, and in particular, to a menu selection apparatus and method using a pointing device for a mobile terminal.

2. Description of the Related Art

A pointing device is a component of a computing machine, such as a personal computer, a personal digital assistant, or a mobile terminal, that is used to move the cursor or pointer on a display screen. An optical joystick, stick point and touch pad are representative examples of a pointing device.

Recently, pointing devices are increasingly being used in small handheld appliances such as mobile terminals, for example, to provide a pointing function similar to that of a mouse in a personal computer.

In menu navigation using a pointing device, the user typically manipulates the pointing device to select a menu item by placing the pointer on the menu item and to execute a function associated with the selected menu item by clicking the activated menu item. The precise control of a pointing device is important for the user's convenience during menu navigation.

In particular, for a mobile terminal having a pointing device, a drifting pointer is a chronic problem. This may be due to the mobility and smallness of the mobile terminal, and can result in the user being inconvenienced by the effects of pointer drift during menu selection.

Further, for menu navigation using a pointing device, a pointer is usually displayed to indicate a particular position on the screen.

Figure 1:
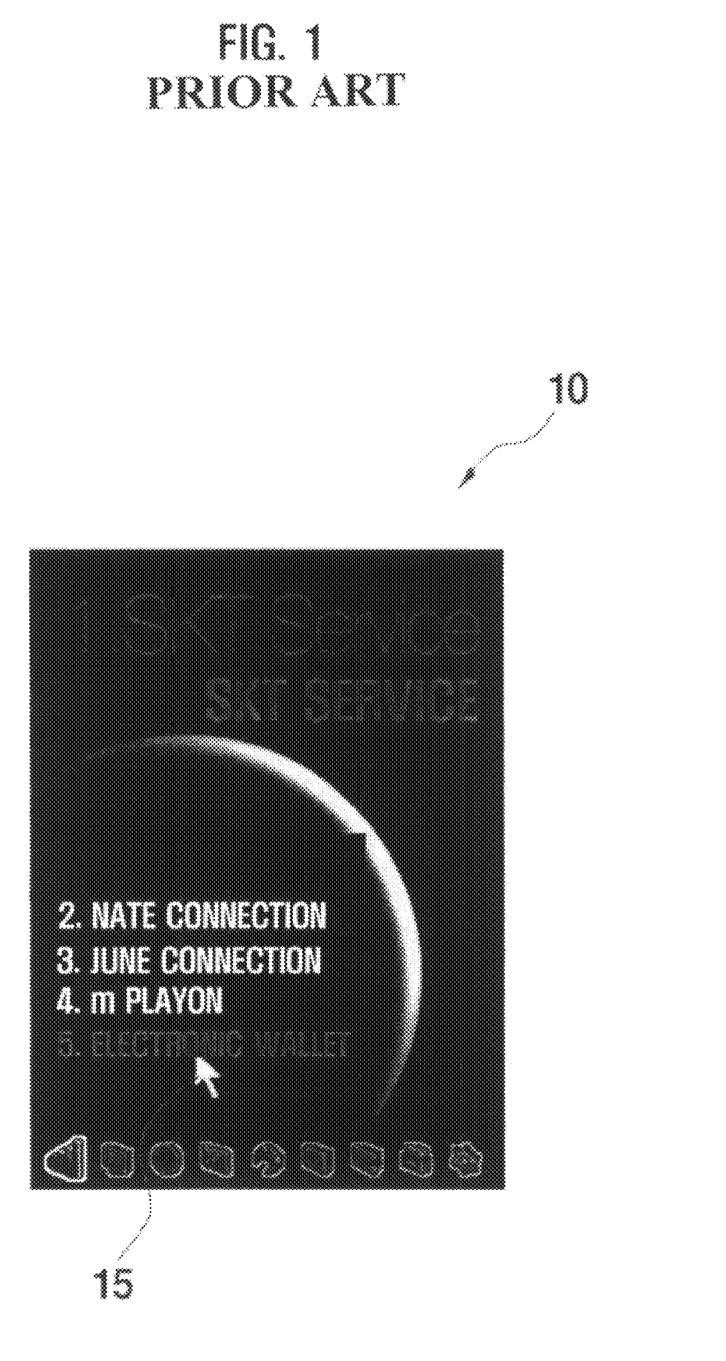
FIG. 1 is a display screen representation illustrating a menu selection method using a conventional pointing means.

FIG. 1 is a display screen representation illustrating menu selection using a pointing device in a conventional manner. In FIG. 1, an arrow-like pointer ( ▶ ) is pointing a menu item '5. Electronic Wallet' for activation in a menu '1. SKT Service' on a screen 10. However, a displayed pointer may hide a portion of the screen display and hinder clear viewing of menu items. Moreover, this problem may become more significant for a mobile terminal having a small display screen.

SUMMARY OF THE INVENTION

The present invention has been made in view of the above problems, and one aspect of the present invention is to provide a method and apparatus that enhance precision of pointer movement for menu navigation using a pointing means.

Another aspect of the present invention is to provide a method and apparatus that enable the user to conveniently move the pointer for menu navigation.

Another aspect of the present invention is to provide a method and apparatus that can turns off the pointer not to hide the screen for clear viewing during menu navigation.

In accordance with an exemplary embodiment of the present invention, there is provided a menu selection apparatus using a pointing means. The apparatus includes a display unit for displaying a menu; a position change detector for detecting a change in a pointing-position of the pointing means; a control unit for outputting a menu selection control signal on the basis of a pointing-position change detected by the position change detector; and a pointer movement processor for updating, according to a menu selection control signal from the control unit, a virtual location of a pointer in units of menu items in a current menu screen.

Preferably, the position change detector includes a small optical sensor, and is installed near the display unit in a front side of the menu selection apparatus.

Preferably, the control unit outputs a menu selection control signal once for each pointing-position change, and the pointer movement processor updates the virtual pointer location once for each menu selection control signal such that a next menu item is selected.

Preferably, the control unit turns off the pointer in the menu screen upon initiation of a menu navigation mode, and turns on the pointer upon termination of the menu navigation mode.

Preferably, the control unit outputs a menu selection control signal if a corresponding pointing-position change is greater than a preset reference movement value.

Preferably, the pointer movement processor sets a direction of pointer movement to a direction of a corresponding pointing-position change, and updates the virtual pointer location according to the set direction of pointer movement.

Preferably, the pointer movement processor sets the direction of pointer movement to 'left/right' if the pointing-position change indicates a position change in the x-axis direction, and sets the direction of pointer movement to 'up/down' if the pointing-position change indicates a position change in the y-axis direction.

Preferably, if the pointing-position change indicates a position change both in the x-axis direction and y-axis direction, and if the difference between the change in the x-axis direction and the change in the y-axis direction is greater than or equal to a preset value, the pointer movement processor sets the direction of pointer movement to 'left/right' when the change in the x-axis direction is greater than the change in the y-axis direction, and sets the direction of pointer movement to 'up/down' when the change in the y-axis direction is greater than the change in the x-axis direction.

Preferably, if menu items in the menu screen are arranged in a single direction, the pointer movement processor updates the virtual pointer location only if the direction of pointer movement is equal to the direction of the menu item arrangement.

Preferably, if menu items in the menu screen are arranged in two directions, the pointer movement processor updates the virtual pointer location only if the direction of pointer movement is equal to a preset priority movement direction.

Preferably, if menu items in the menu screen are arranged in two directions, the pointer movement processor updates the virtual pointer location only if the direction of pointer movement is not equal to a preset locked movement direction.

Preferably, the pointer movement processor updates the virtual pointer location only if the pointing-position change is greater than a preset reference movement value.

Preferably, the pointer movement processor divides the pointing-position change by a unit movement value to obtain the number of virtual pointer location updates, and repeats updating the virtual pointer location in units of one menu item until the number of repetition is equal to the obtained number of virtual pointer location updates.

Preferably, if the pointing-position change exceeds a preset limit value, the pointer movement processor sets the virtual pointer location to a location of the last menu item in the direction of the pointing-position change.

Preferably, the pointer movement processor displays a pointer location update icon indicating a direction of pointer movement in a central region of the menu screen during updating of the virtual pointer location.

Preferably, the pointing means is an optical joystick.

According to another exemplary embodiment of the present invention, there is provided a menu selection method using a pointing means. The method includes displaying a menu during a menu navigation mode; detecting a change in a pointing-position of the pointing means; and updating, in response to detection of a pointing-position change, a virtual location of a pointer in units of menu items in a current menu screen; turning off the pointer in the menu screen upon initiation of the menu navigation mode; and turning on the pointer upon termination of the menu navigation mode.

Preferably, the turning off of a pointer further includes saving a current location of the pointer.

Preferably, the detecting of a change in a pointing-position of the pointing means further includes outputting a menu selection control signal once for each occurrence of a pointing-position change, and the updating a virtual pointer location step includes updating the virtual pointer location once for each occurrence of a menu selection control signal such that a next menu item is selected.

Preferably, the updating of a virtual pointer location further includes updating, if a corresponding pointing-position change is greater than a preset reference movement value, the virtual pointer location.

Preferably, the updating of a virtual pointer location further includes setting a direction of pointer movement to a direction of the pointing-position change.

Preferably, the setting of a direction of pointer movement further includes setting, if the pointing-position change indicates a position change in the x-axis direction, the direction of pointer movement to 'left/right', and setting, if the pointing-position change indicates a position change in the y-axis direction, the direction of pointer movement to 'up/down'.

Preferably, the setting of a direction of pointer movement further includes setting, if the pointing-position change indicates a position change both in the x-axis direction and y-axis direction and if the difference between the change in the x-axis direction and the change in the y-axis direction is greater than or equal to a preset value, the direction of pointer movement to 'left/right' when the change in the x-axis direction is greater than the change in the y-axis direction, and to 'up/down' when the change in the y-axis direction is greater than the change in the x-axis direction.

Preferably, the updating of a virtual pointer location further includes updating, if menu items in the current menu screen are arranged in a single direction and if the direction of pointer movement is equal to the direction of the menu item arrangement, the virtual pointer location.

Preferably, the updating of a virtual pointer location further includes updating, if menu items in the current menu screen are arranged in two directions and if the direction of pointer movement is equal to a preset priority movement direction, the virtual pointer location.

Preferably, the updating of a virtual pointer location further includes updating, if menu items in the current menu screen are arranged in two directions and if the direction of pointer movement is not equal to a preset locked movement direction, the virtual pointer location.

Preferably, the updating of a virtual pointer location further includes: dividing the pointing-position change by a unit movement value to obtain the number of virtual pointer location updates; and repeating updating the virtual pointer location in units of one menu item until the number of repetition is equal to the obtained number of virtual pointer location updates.

Preferably, the updating of a virtual pointer location further includes setting, if the pointing-position change exceeds a preset limit value, the virtual pointer location to a location of the last menu item in a direction of the pointing-position change.

Preferably, the updating of a virtual pointer location further includes displaying a pointer location update icon indicating a direction of pointer movement in a central region of the menu screen during updating of the virtual pointer location.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Hereinafter, exemplary embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail.

Figure 2:
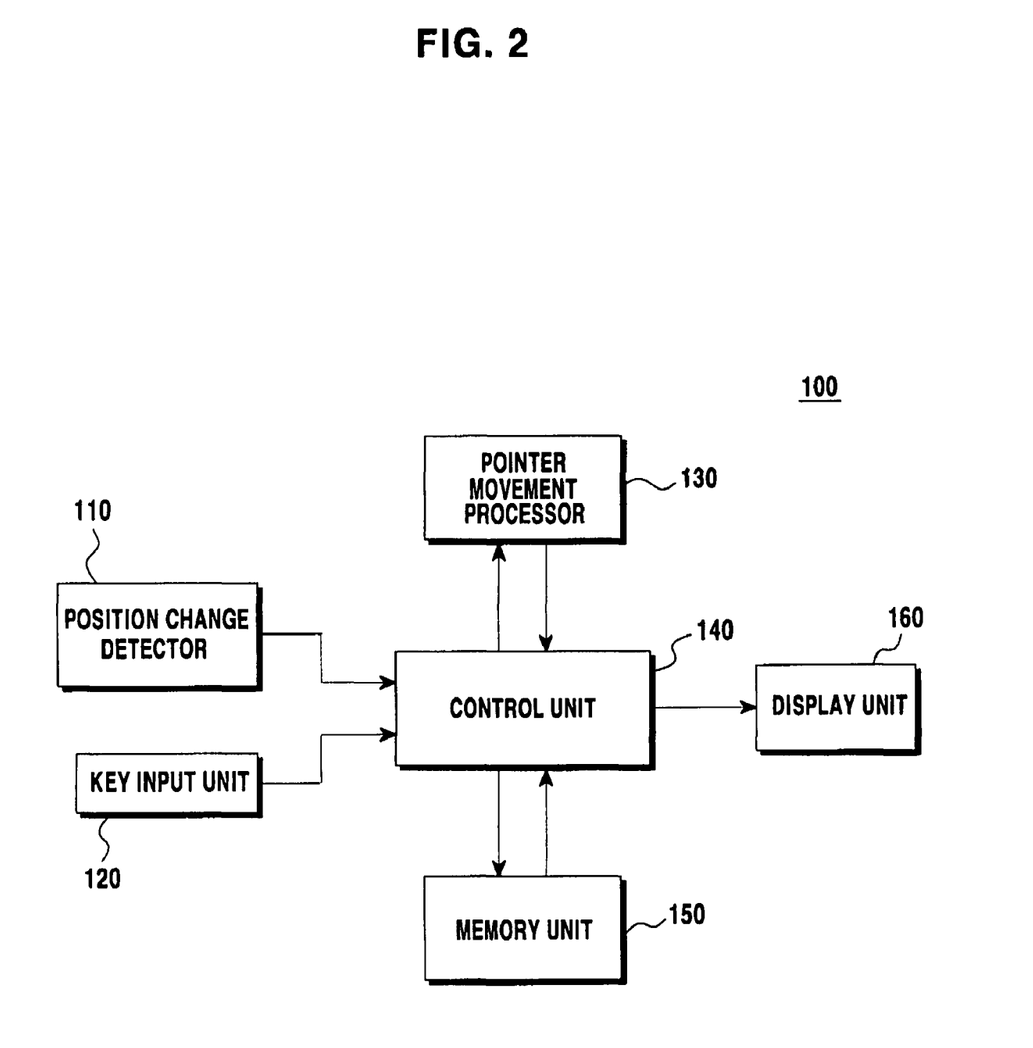
FIG. 2 is a schematic diagram illustrating a configuration of a menu selection apparatus using a pointing means according to an exemplary embodiment of the present invention.

FIG. 2 schematically illustrates a configuration of a menu selection apparatus 100 using a pointing means according to an exemplary embodiment of the present invention. In FIG. 2, the menu selection apparatus 100 includes a position change detector 110, key input unit 120, pointer movement processor 130, control unit 140, memory unit 150, and display unit 160.

In operation, the position change detector 110 detects a change in the pointing-position of the pointing means due to movement of a finger or thumb of the user, and sends pointing-position change data to the control unit 140. A pointing-position change reflects the direction and length of movement of a finger or thumb of the user. Preferably, the position change detector 110 includes a small optical sensor, and is installed near the display unit 160 in the front of the menu selection apparatus 100. The position change detector 110 senses the direction and distance of movement of a finger or thumb of the user through the optical sensor.

The key input unit 120 receives a key signal from the user for controlling operations of the menu selection apparatus 100, and sends the received key signal to the control unit 140. In particular, the key input unit 120 receives a key signal for setting a priority direction and locked direction and for canceling setting of the priority direction and locked direction for pointer movement.

The pointer movement processor 130 updates a virtual pointer location in units of menu items in the current menu screen according to a menu selection control signal from the control unit 140. The virtual pointer location refers to the location of the pointer on the screen of the display unit 160 when the pointer is hidden or turned off during menu navigation.

The pointer movement processor 130 receives pointing-position change data from the position change detector 110 via the control unit 140, and identifies the direction of pointer movement if necessary and updates the virtual pointer location accordingly.

Specifically, if the pointing-position change data indicates a position change in the x-axis direction, the direction of pointer movement is set to 'left/right'. If the pointing-position change data indicates a position change in the y-axis direction, the direction of pointer movement is set to 'up/down'. When the pointing-position change data indicates a position change both in the x-axis direction and y-axis direction, the difference between the change in the x-axis direction and the change in the y-axis direction is considered. For example, only if the difference is greater than or equal to a preset value, the direction of pointer movement is set to 'left/right' when the change in the x-axis direction is greater than the change in the y-axis direction, and is set to 'up/down' when the change in the y-axis direction is greater than the change in the x-axis direction.

In addition, the pointer movement processor 130 identifies arrangement of menu items in a current menu screen. Here, when menu items are arranged in a single direction (namely, either in the up/down direction or in the left/right direction), the pointer movement processor 130 updates the virtual pointer location only if the set direction of pointer movement is equal to the identified direction of the menu item arrangement. For example, if menu items are arranged in the left/right direction, the virtual pointer location is updated only when the direction of pointer movement is 'left/right'.

When menu items are arranged in two directions (namely, both in the up/down direction and in the left/right direction), the pointer movement processor 130 updates the virtual pointer location in consideration of a priority movement direction and locked movement direction, which are directions of pointer movement settable in advance by the user to prevent inadvertent pointer movement.

When a priority movement direction is set, the pointer movement processor 130 updates the virtual pointer location only if the set direction of pointer movement is equal to the priority movement direction. For example, if a priority movement direction is preset to 'up/down', the virtual pointer location is updated only when the direction of pointer movement is 'up/down'. An attempt of pointer movement in a direction not equal to the preset priority movement direction is ignored.

When a locked movement direction is set, the pointer movement processor 130 updates the virtual pointer location only if the set direction of pointer movement is not equal to the locked movement direction. For example, if a locked movement direction is preset to 'left/right', the virtual pointer location is updated only when the direction of pointer movement is 'up/down'. An attempt of pointer movement in a direction equal to the preset locked movement direction is ignored.

Further, the pointer movement processor 130 updates the virtual pointer location only when a pointing-position change is greater than a reference movement value set in advance so as to prevent overly sensitive movement of the pointer.

The pointer movement processor 130 may update the virtual pointer location on the basis of the magnitude of a pointing-position change or the number of pointing-position changes.

For example, dividing a pointing-position change by a unit movement value gives the number of virtual pointer location updates, which is then translated into the number of pointer movements in units of one menu item. Preferably, the unit movement value is equal to the reference movement value. Alternatively, the virtual pointer location can be updated once for each pointing-position change. That is, the number of pointing-position changes is translated into the number of pointer movements in units of one menu item.

When a pointing-position change exceeds a preset limit value, the pointer movement processor 130 sets the virtual pointer location to the location of the last menu item in the direction of the pointing-position change.

Figure 6A:
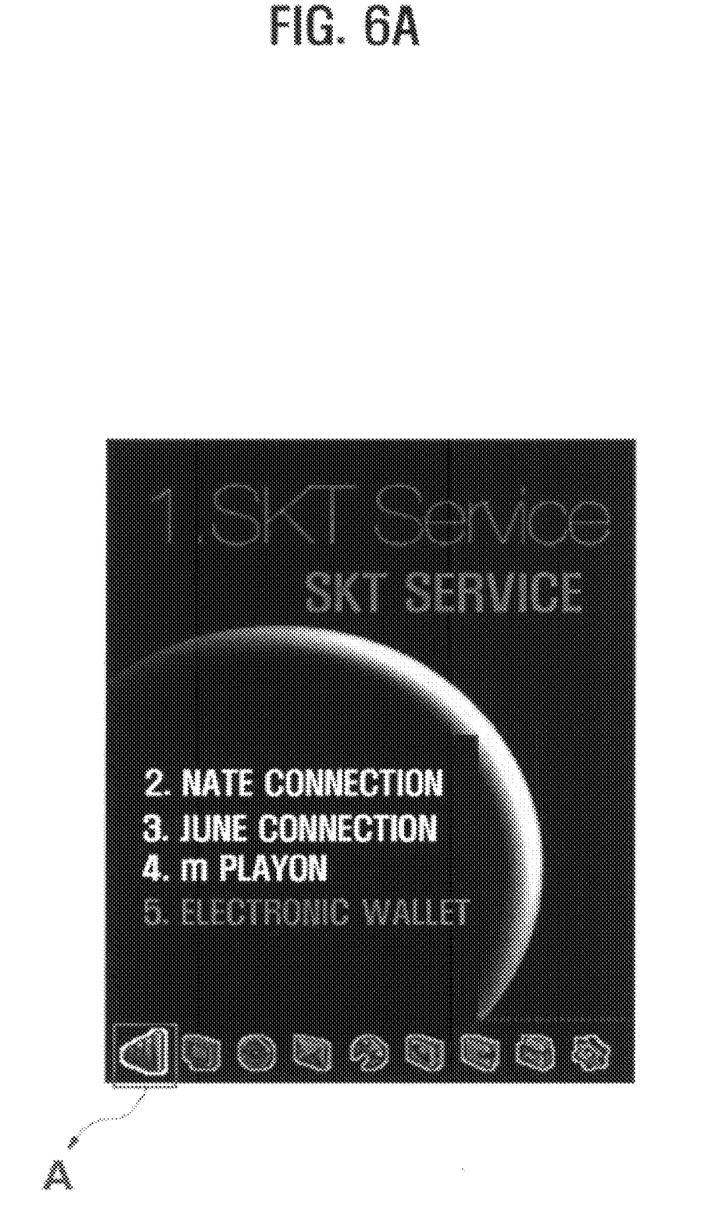
FIGS. 6A to 6D illustrate screen representations in use of the menu selection apparatus of FIG. 2.
Figure 6B:
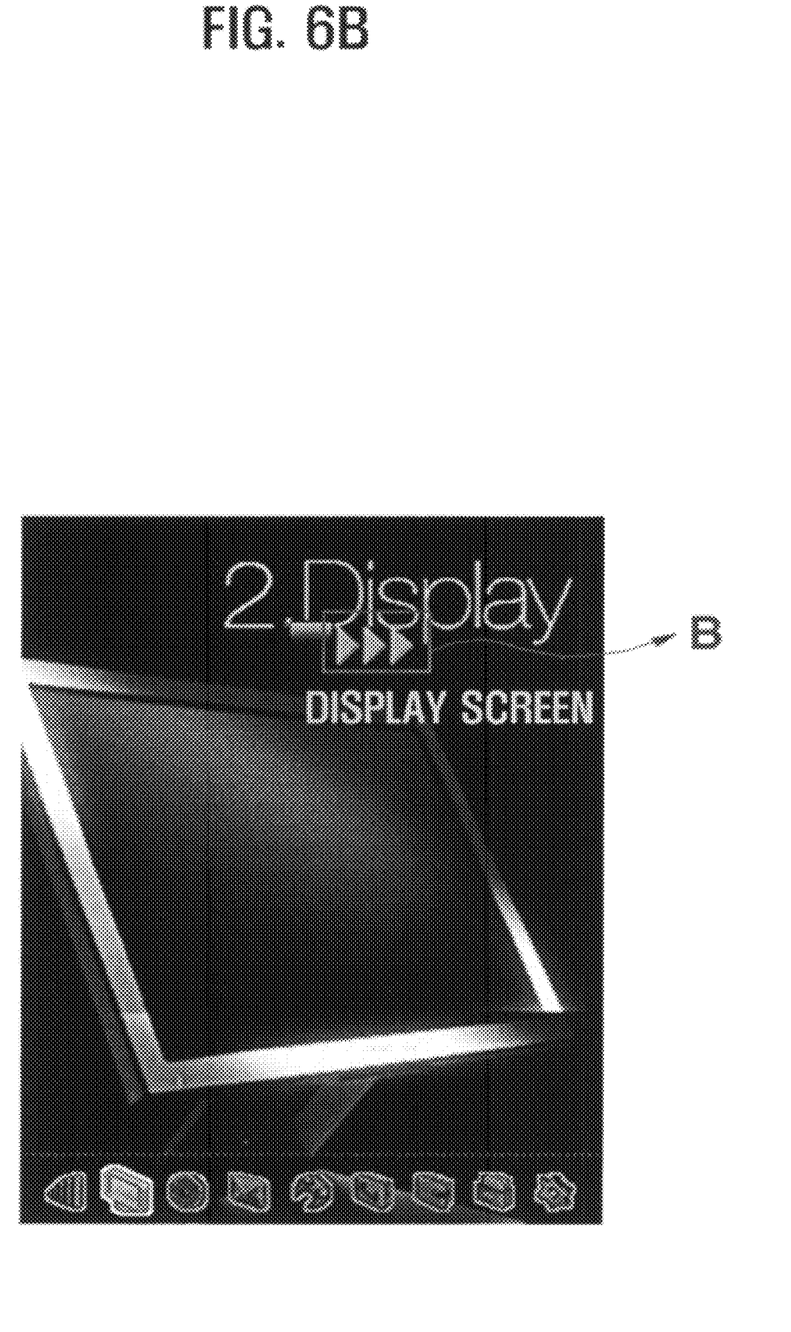
Figure 6C:
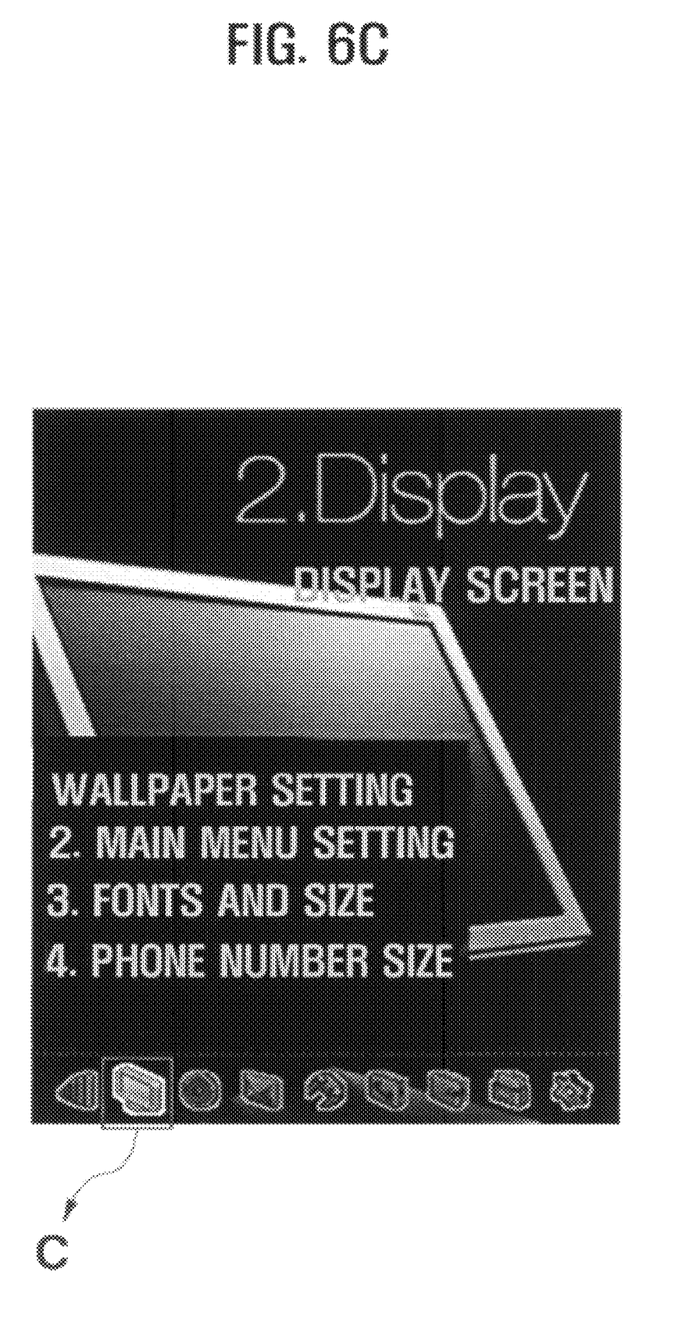
Figure 6D:
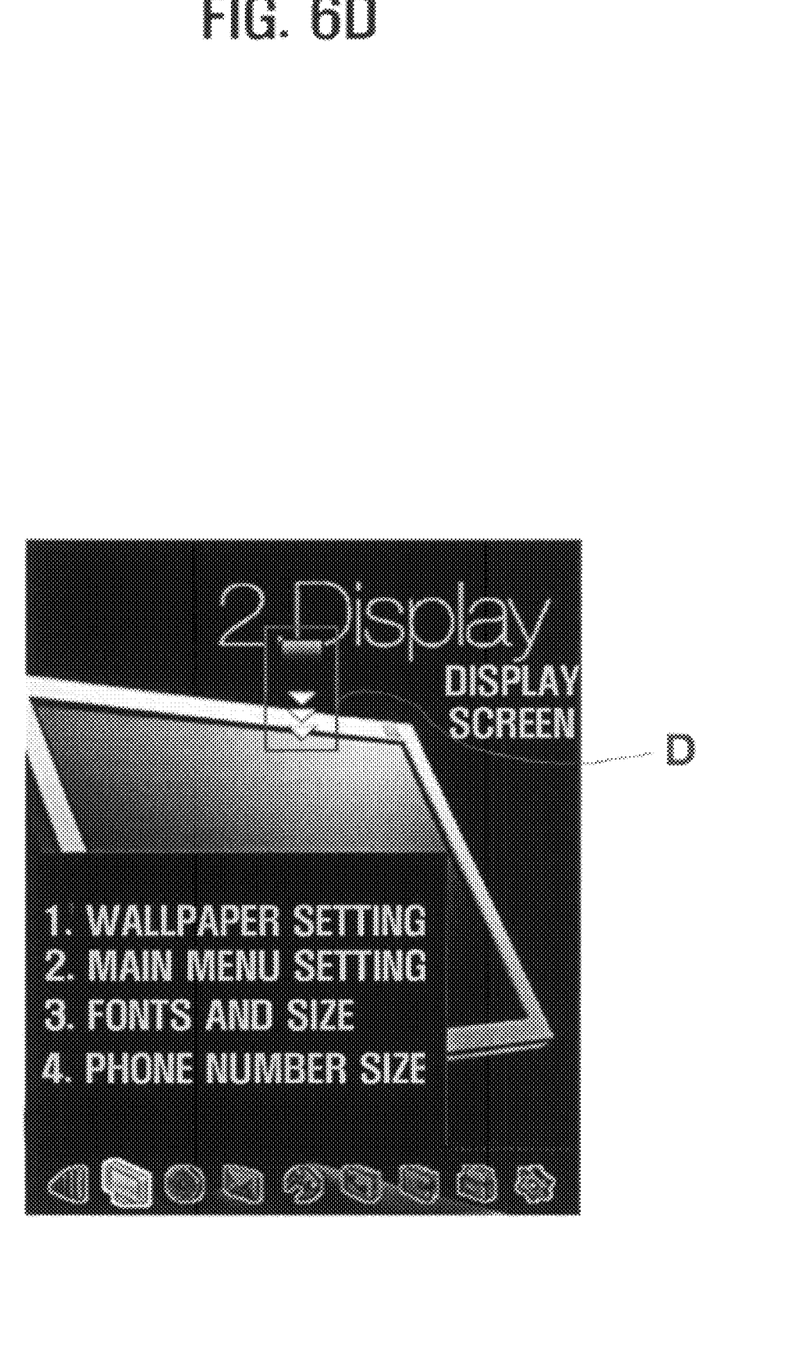

During updating of the virtual pointer location, the pointer movement processor 130 displays a pointer location update icon indicating the direction of pointer movement, preferably, in the central region of the screen, as illustrated in FIGS. 6B and 6D. The screen representation of FIG. 6B illustrates a pointer location update icon B indicating pointer movement in a 'left/right' direction. The screen representation of FIG. 6D illustrates a pointer location update icon D indicating pointer movement in an up/down direction.

The control unit 140 generates a menu selection control signal corresponding to pointing-position change data from the position change detector 110, and outputs the menu selection control signal to the pointer movement processor 130. The control unit 140 may output a menu selection control signal once for each pointing-position change, and the pointer movement processor 130 may update the virtual pointer location such that a next menu item is newly selected for each menu selection control signal.

The control unit 140 turns off (i.e., hides) the pointer in the current menu screen at initiation of a menu navigation mode, and turns on the pointer at termination of the menu navigation mode, for clear viewing of displayed images. Moreover, the control unit 140 saves the current location of the pointer when the pointer is turned off, and may place the pointer using the saved location when the pointer is turned on.

The control unit 140 may output a menu selection control signal only when a corresponding pointing-position change is greater than the reference movement value set in advance. This is also to prevent overly sensitive movement of the pointer.

Further, the control unit 140 maintains supplementary direction-related information such as a priority movement direction and locked movement direction, and provides the supplementary direction-related information to the pointer movement processor 130.

When an update command signal for the supplementary direction-related information is input through the position change detector 110 or the key input unit 120, the control unit 140 updates the supplementary direction-related information. In cases when menu items are arranged in two directions ('up/down' and 'left/right') and one of the two directions is set as a priority movement direction, if a corresponding pointing-position change exceeds a preset limit value in the other direction, the control unit 140 resets the priority movement direction to the other direction.

When a command signal for setting the priority movement direction or locked movement direction or for canceling setting thereof is input through the key input unit 120, the control unit 140 sets the priority movement direction or locked movement direction or cancels setting thereof.

The memory unit 150 stores information necessary for operation of the menu selection apparatus 100.

The display unit 160 displays a menu selection screen. In particular, the display unit 160 moves the pointer in units of menu items. During a menu navigation mode, the pointer is preferably hidden from the menu selection screen.

Preferably, the menu selection apparatus 100 is a mobile communication terminal, and the pointing means is an optical joystick.

Figure 3:
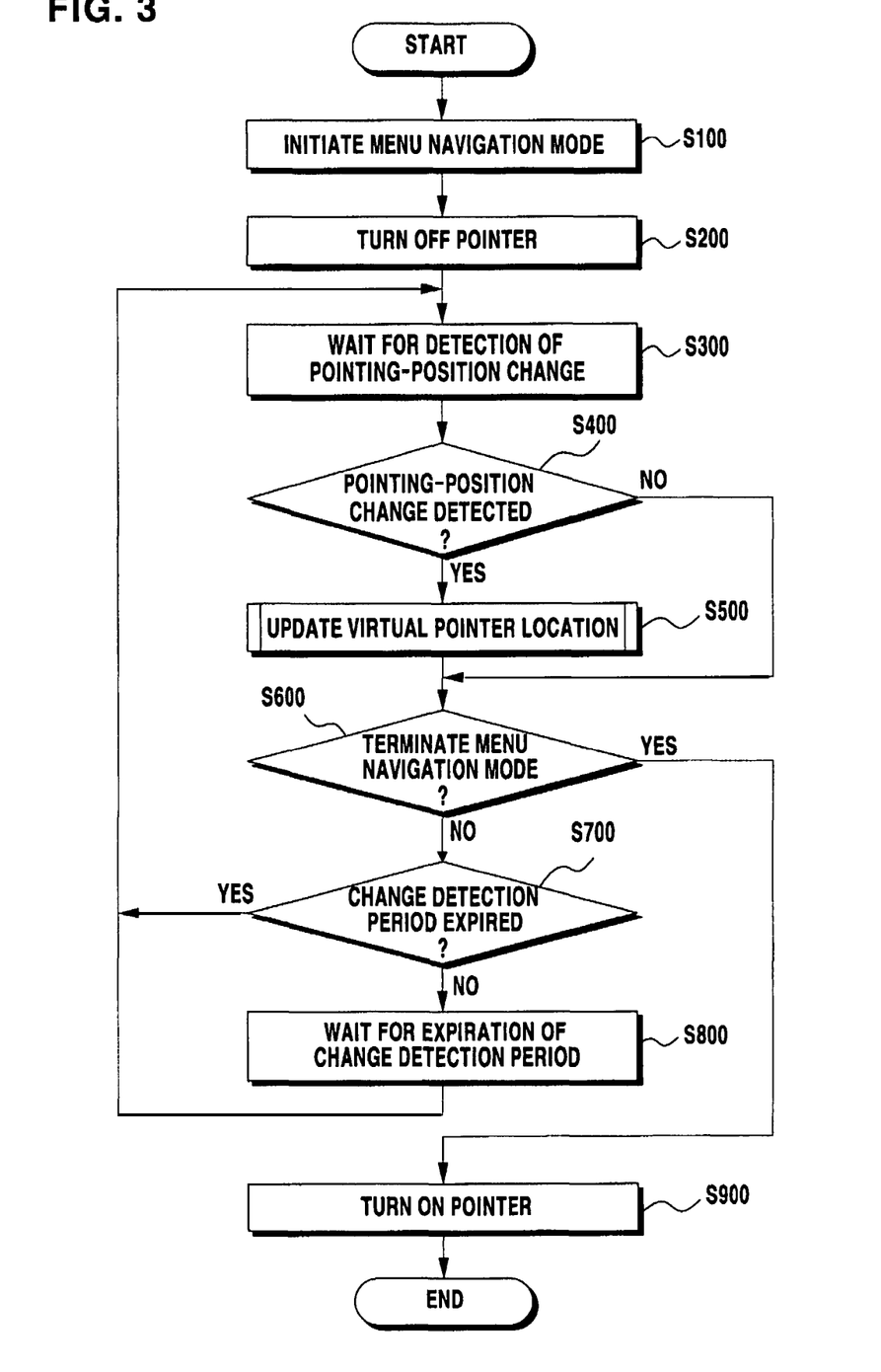
FIG. 3 is a flow chart illustrating a menu selection method using a pointing means according to another exemplary embodiment of the present invention.

FIG. 3 is a flow chart illustrating a menu selection method using a pointing means according to another exemplary embodiment of the present invention. In FIGS. 2 and 3, the menu selection method is described as follows.

When the user inputs a command for initiating a menu navigation mode through the key input unit 120 in step S100, the control unit 140 controls the display unit 160 to display a menu selection screen, and hides the pointer from the menu selection screen in step S200. At hiding of the pointer, the control unit 140 preferably stores the current location of the pointer for later use.

The control unit 140 controls the position change detector 110 to detect a change in the pointing-position of the pointing means in step S300.

If a change in the pointing-position is detected, the control unit 140 outputs a menu selection control signal to the pointer movement processor 130 in step S400. In response to the menu selection control signal, the pointer movement processor 130 updates the virtual pointer location such that the next menu item is selected in step S500. A procedure to update the virtual pointer location is described later in connection with FIG. 4.

Steps S300, S400, and S500 are performed once for each change detection period until a command for terminating the menu navigation mode is input. If, however, a current change detection period does not expire in step S700, the control unit 140 awaits expiration of the change detection period in step S800.

If a command for terminating the menu navigation mode is input in step S600, the control unit 140 terminates the menu navigation mode, controls the display unit 160 to redisplay the pointer on the menu screen in step S900, and performs a function associated with the selected menu item.

Figure 4:
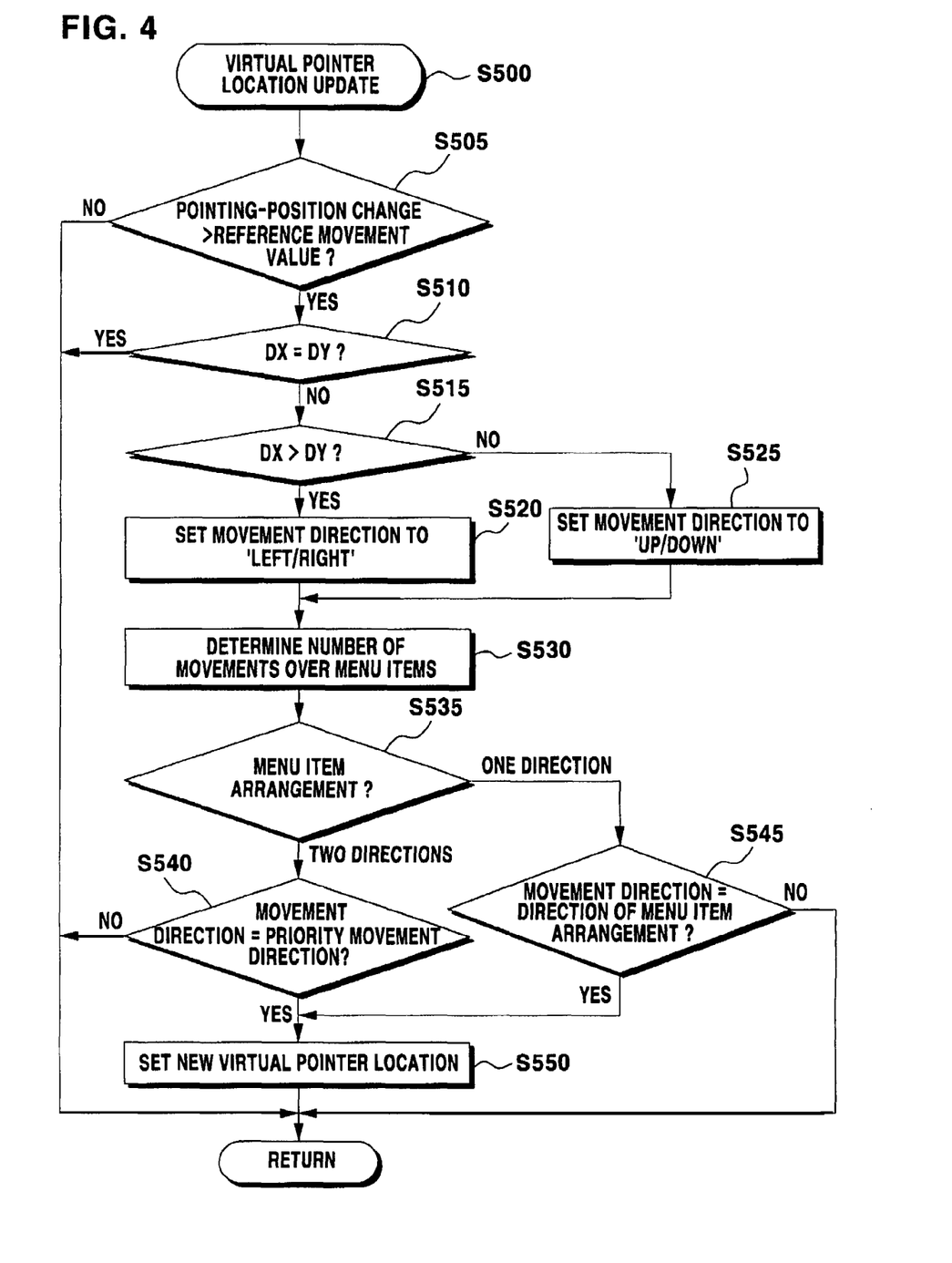
FIG. 4 is a flow chart illustrating a virtual pointer location update procedure in the menu selection method of FIG. 3.

FIG. 4 is a flow chart illustrating a virtual pointer location update procedure in step S500 in the menu selection method of FIG. 3.

Referring now to FIGS. 2 and 4, the pointer movement processor 130 compares the detected pointing-position change with a preset reference movement value in step S505. If the pointing-position change is greater than the reference movement value, the pointer movement processor 130 continues the virtual pointer location update procedure. Otherwise, the pointer movement processor 130 performs nothing.

In addition, the pointer movement processor 130 sets the direction of pointer movement to the direction of the pointing-position change, and updates the virtual pointer location accordingly. Specifically, the direction of pointer movement is set to 'left/right' if the pointing-position change indicates a position change in the x-axis direction, and is set to 'up/down' if the pointing-position change indicates a position change in the y-axis direction. In cases when the pointing-position change indicates a position change both in the x-axis direction and y-axis direction, the difference between the change in the x-axis direction and the change in the y-axis direction is considered. That is, only if the difference is greater than or equal to a preset value, the direction of pointer movement is set to 'left/right' when the change in the x-axis direction is greater than the change in the y-axis direction, and is set to 'up/down' when the change in the y-axis direction is greater than the change in the x-axis direction.

Thereto, the pointer movement processor 130 compares the change in the x-axis direction (dx) with the change in the y-axis direction (dy) in step S510. If dx is not equal to dy, the pointer movement processor 130 continues the virtual pointer location update procedure. However, if dx is equal to dy, the pointer movement processor 130 performs nothing.

If dx is greater than dy, the pointer movement processor 130 sets the direction of pointer movement to 'left/right' in step S520. Conversely, if dx is less than dy, the pointer movement processor 130 sets the direction of pointer movement to 'up/down' in step S525.

Thereafter, the pointer movement processor 130 determines the number of pointer movements in units of one menu item in step S530. The number of pointer movements may be determined using the magnitude of a pointing-position change or the number of pointing-position changes.

That is, dividing a pointing-position change by a unit movement value gives the number of virtual pointer location updates, which is then translated into the number of pointer movements in units of one menu item. For example, three (3) pointer movements mean moving the pointer forward by three menu items. The unit movement value is preferably equal to the reference movement value. In step S530, if the determined number of pointer movements exceeds a preset limit value, the pointer movement processor 130 sets the virtual pointer location to the location of the last menu item in the direction of a corresponding pointing-position change.

Alternatively, the virtual pointer location may be updated once for each pointing-position change. That is, the number of pointing-position changes is translated into the number of pointer movements in units of one menu item.

After determination of the direction of pointer movement and the number of pointer movements, the pointer movement processor 130 identifies arrangement of menu items in the current menu screen for updating the virtual pointer location in step S535.

If menu items are arranged in two directions, the pointer movement processor 130 determines to update the virtual pointer location in consideration of a priority movement direction and locked movement direction in step S540. When a priority movement direction is set, the pointer movement processor 130 determines to update the virtual pointer location only if the direction of pointer movement is equal to the priority movement direction. When a locked movement direction is set, the pointer movement processor 130 determines to update the virtual pointer location only if the direction of pointer movement is not equal to the locked movement direction.

If menu items are arranged in a single direction, the pointer movement processor 130 determines to update the virtual pointer location only if the direction of pointer movement is equal to the identified direction of the menu item arrangement in step S545.

The pointer movement processor 130 updates the virtual pointer location using the number of pointer movements and direction of pointer movement determined above in step S550.

During updating of the virtual pointer location, the pointer movement processor 130 may display a pointer location update icon indicating the direction of pointer movement, preferably, in a central region of the screen.

Figure 5:
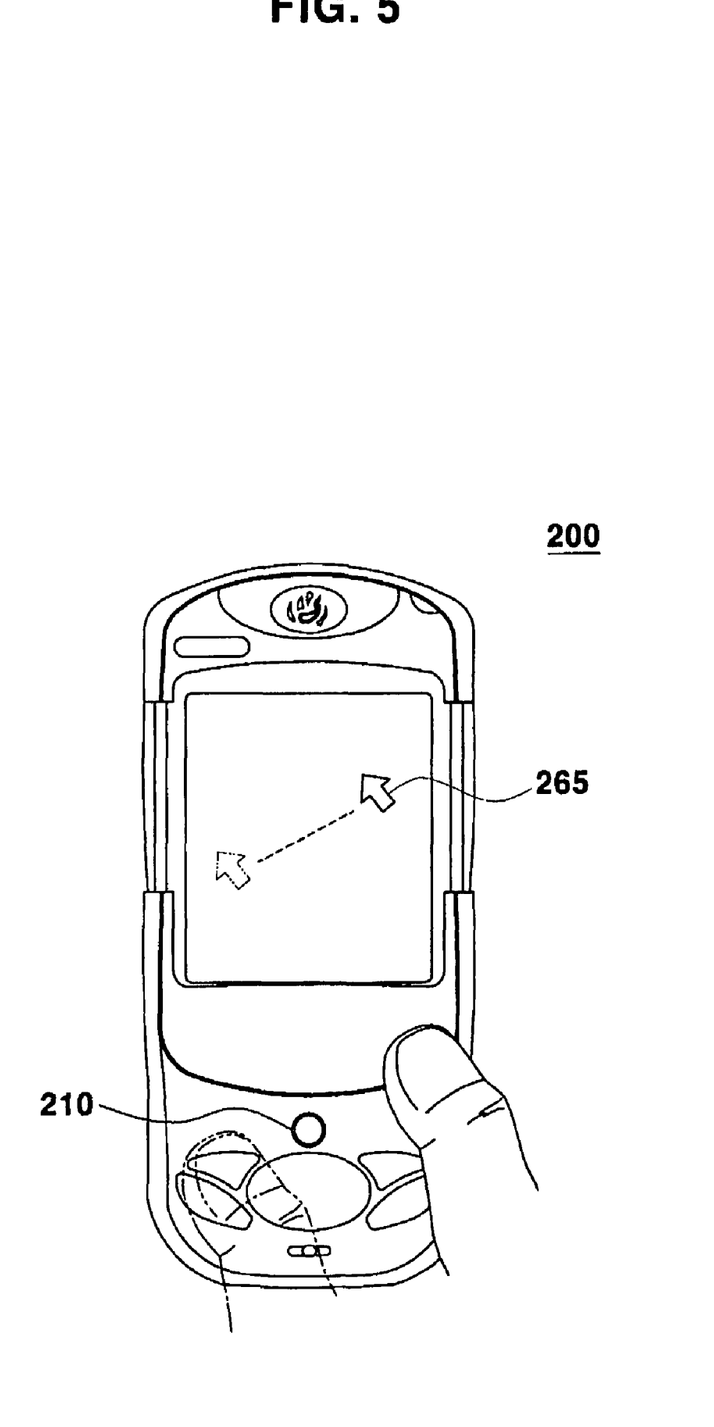
FIG. 5 illustrates a usage state of a mobile communication terminal having a pointing means for menu selection.

FIG. 5 illustrates a usage state of a mobile communication terminal 200 having a pointing means for menu selection.

In FIG. 5, the mobile communication terminal 200 includes a small optical sensor 210 in the front, and moves a pointer 265 according to movement of a finger or thumb of a user detected using optical signals from the optical sensor 210. The pointer 265 then moves on a screen in proportion to the direction and length of movement of a finger or thumb of the user.

The mobile communication terminal 200 of FIG. 5 is not in a menu navigation mode. However, upon initiation of the menu navigation mode, the mobile communication terminal 200 turns off the pointer 265. That is, during the menu navigation mode, the pointer 265 is hidden from the screen, and instead the virtual pointer location is updated according to a user's movements.

FIGS. 6A to 6D illustrate screen representations in use of the menu selection apparatus of FIG. 2 according to an exemplary embodiment of the present invention.

FIG. 6A illustrates an initial menu screen for menu navigation in a mobile communication terminal using a pointing means. In the menu screen of FIG. 6A, a first top level menu A ('1. SKT Service') has a plurality of lower level menu items, one lower level menu item ('5. Electronic Wallet') is selected, and the pointer is hidden.

FIG. 6B illustrates a menu screen derived from the menu screen of FIG. 6A through a pointing-position change in a right-handed direction caused by the user. In the menu screen of FIG. 6B, a second top level menu ('2. Display Screen') is selected by the user, and a pointer location update icon B having right direction arrows is displayed to indicate menu navigation in a right-handed direction.

FIG. 6C illustrates a menu screen derived from the menu screen of FIG. 6B after updating of the virtual pointer location. In the menu screen of FIG. 6C, while the second top level menu ('2. Display Screen') is being displayed, one lower level menu item ('1. Wallpaper Setting') of the second top level menu is selected.

FIG. 6D illustrates a menu screen derived from the menu screen of FIG. 6C through a pointing-position change in a downward direction caused by the user. In the menu screen of FIG. 6D, one lower level menu item ('4. Phone Number Size') of the second top level menu is selected, and a pointer location update icon D having downward arrows is displayed to indicate menu navigation in a downward direction.

As described above, the present invention provides a menu selection method and apparatus using a pointing means. Advantageously, precision of the pointer's movement for purposes of menu navigation can be enhanced for user convenience, and the pointer is turned off during menu navigation for clear viewing.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. A menu selection apparatus using a pointing means, comprising:
a display unit for displaying a menu;
a position change detector for detecting a change in a pointing-position of the pointing means;
a control unit for outputting a menu selection control signal on the basis of a pointing-position change detected by the position change detector; and
a pointer movement processor for updating, according to a menu selection control signal from the control unit, a virtual location of a pointer in units of menu items in a current menu screen,
wherein the control unit outputs the menu selection control signal if the corresponding pointing-position change is greater than a preset reference movement value.

2. The menu selection apparatus of claim 1, wherein the position change detector includes an optical sensor.

3. The menu selection apparatus of claim 2, wherein the position change detector is installed near the display unit in a front side of the menu selection apparatus.

4. The menu selection apparatus of claim 1, wherein the control unit outputs the menu selection control signal once for each pointing-position change, and the pointer movement processor updates the virtual pointer location once for each menu selection control signal such that a next menu item is selected.

5. The menu selection apparatus of claim 1, wherein the control unit turns off the pointer in the menu screen upon initiation of a menu navigation mode, and turns on the pointer upon termination of the menu navigation mode.

6. The menu selection apparatus of claim 5, wherein the control unit saves a current location of the pointer when turning off the pointer, and uses the saved location when turning on the pointer.

7. The menu selection apparatus of claim 1, wherein the pointer movement processor sets a direction of pointer movement to a direction of the corresponding pointing-position change, and updates the virtual pointer location according to the set direction of pointer movement.

8. The menu selection apparatus of claim 7, wherein the pointer movement processor sets the direction of pointer movement to 'left/right' if the pointing-position change indicates a position change in the x-axis direction, and sets the direction of pointer movement to 'up/down' if the pointing-position change indicates a position change in the y-axis direction.

9. The menu selection apparatus of claim 7, wherein if the pointing-position change indicates a position change both in the x-axis direction and y-axis direction, and if the difference between the change in the x-axis direction and the change in the y-axis direction is greater than or equal to a preset value, the pointer movement processor sets the direction of pointer movement to 'left/right' when the change in the x-axis direction is greater than the change in the y-axis direction, and sets the direction of pointer movement to 'up/down' when the change in the y-axis direction is greater than the change in the x-axis direction.

10. The menu selection apparatus of claim 8, wherein if menu items in the menu screen are arranged in a single direction, the pointer movement processor updates the virtual pointer location only if the direction of pointer movement is equal to the direction of the menu item arrangement.

11. The menu selection apparatus of claim 8, wherein if menu items in the menu screen are arranged in two directions, the pointer movement processor updates the virtual pointer location only if the direction of pointer movement is equal to a preset priority movement direction.

12. The menu selection apparatus of claim 8, wherein if menu items in the menu screen are arranged in two directions, the pointer movement processor updates the virtual pointer location only if the direction of pointer movement is not equal to a preset locked movement direction.

13. The menu selection apparatus of claim 7, wherein the pointer movement processor updates the virtual pointer location only if the pointing-position change is greater than the preset reference movement value.

14. The menu selection apparatus of claim 13, wherein the pointer movement processor divides the pointing-position change by a unit movement value to obtain the number of virtual pointer location updates, and repeats updating the virtual pointer location in units of one menu item until the number of repetition is equal to the obtained number of virtual pointer location updates.

15. The menu selection apparatus of claim 14, wherein the unit movement value is equal to the reference movement value.

16. The menu selection apparatus of claim 13, wherein if the pointing-position change exceeds a preset limit value, the pointer movement processor sets the virtual pointer location to a location of the last menu item in the direction of the pointing-position change.

17. The menu selection apparatus of claim 1, wherein the pointer movement processor displays a pointer location update icon on the menu screen during updating of the virtual pointer location.

18. The menu selection apparatus of claim 17, wherein the pointer movement processor displays the pointer location update icon in a central region of the menu screen.

19. The menu selection apparatus of claim 17, wherein the pointer location update icon indicates a direction of pointer movement.

20. The menu selection apparatus of claim 1, wherein the menu selection apparatus is a mobile communication terminal.

21. The menu selection apparatus of claim 1, wherein the pointing means is an optical joystick.

* * * * *